(12) United States Patent
Asatani

(10) Patent No.: US 11,073,716 B2
(45) Date of Patent: Jul. 27, 2021

(54) DISPLAY DEVICE AND METHOD OF PRODUCING THE SAME

(71) Applicant: SHARP KABUSHIKI KAISHA, Sakai (JP)

(72) Inventor: Shuhichiroh Asatani, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 6 days.

(21) Appl. No.: 16/202,038

(22) Filed: Nov. 27, 2018

(65) Prior Publication Data
US 2019/0162893 A1 May 30, 2019

(30) Foreign Application Priority Data

Nov. 29, 2017 (JP) .............................. JP2017-228994

(51) Int. Cl.
*G02F 1/1335* (2006.01)
*F21V 8/00* (2006.01)
*G02F 1/13357* (2006.01)

(52) U.S. Cl.
CPC ..... *G02F 1/133504* (2013.01); *G02B 6/0051* (2013.01); *G02B 6/0055* (2013.01); *G02B 6/0056* (2013.01); *G02B 6/0073* (2013.01); *G02B 6/0088* (2013.01); *G02F 1/133606* (2013.01); *G02F 1/133607* (2021.01); *G02F 1/133615* (2013.01); *C09K 2323/04* (2020.08); *G02F 1/133528* (2013.01); *G02F 2202/22* (2013.01)

(58) Field of Classification Search
CPC .. G02B 6/0056; G02B 6/0073; G02B 6/0051; G02B 6/0088; G02B 6/0055; G02F 1/133504; G02F 1/133606; G02F 1/133615; G02F 1/133528; G02F 2202/22; G02F 2001/133607; G02F 1/133607; G02F 1/33615; C09K 2323/04
See application file for complete search history.

(56) References Cited

U.S. PATENT DOCUMENTS

| | | | |
|---|---|---|---|
| 2008/0278456 A1* | 11/2008 | Huang | G06F 3/0412 345/173 |
| 2009/0135622 A1* | 5/2009 | Johnson | G09F 13/22 362/602 |
| 2009/0162617 A1* | 6/2009 | Moroishi | G02B 5/0294 428/172 |
| 2010/0033442 A1* | 2/2010 | Kusuda | G06F 3/041 345/173 |
| 2011/0181813 A1 | 7/2011 | Kim et al. | |
| 2017/0054067 A1* | 2/2017 | Zhang | H01L 41/113 |
| 2017/0118828 A1* | 4/2017 | Li | G02F 1/133784 |
| 2017/0331396 A1 | 11/2017 | Byun et al. | |
| 2020/0395870 A1 | 12/2020 | Byun et al. | |

FOREIGN PATENT DOCUMENTS

| | | |
|---|---|---|
| CN | 1985289 A | 6/2007 |
| CN | 103838011 A | 6/2014 |
| CN | 105470313 A | 4/2016 |
| CN | 107359686 A | 11/2017 |
| JP | 2014-160246 A | 9/2014 |

\* cited by examiner

*Primary Examiner* — Sophie Hon
(74) *Attorney, Agent, or Firm* — ScienBiziP, P.C.

(57) ABSTRACT

A display device includes an optical member and an optical sheet that is in a sheet form. The optical member includes a first surface. The optical sheet includes a second surface that is disposed to be opposed to the first surface. The first surface and the second surface are charged to a same polarity.

5 Claims, 3 Drawing Sheets

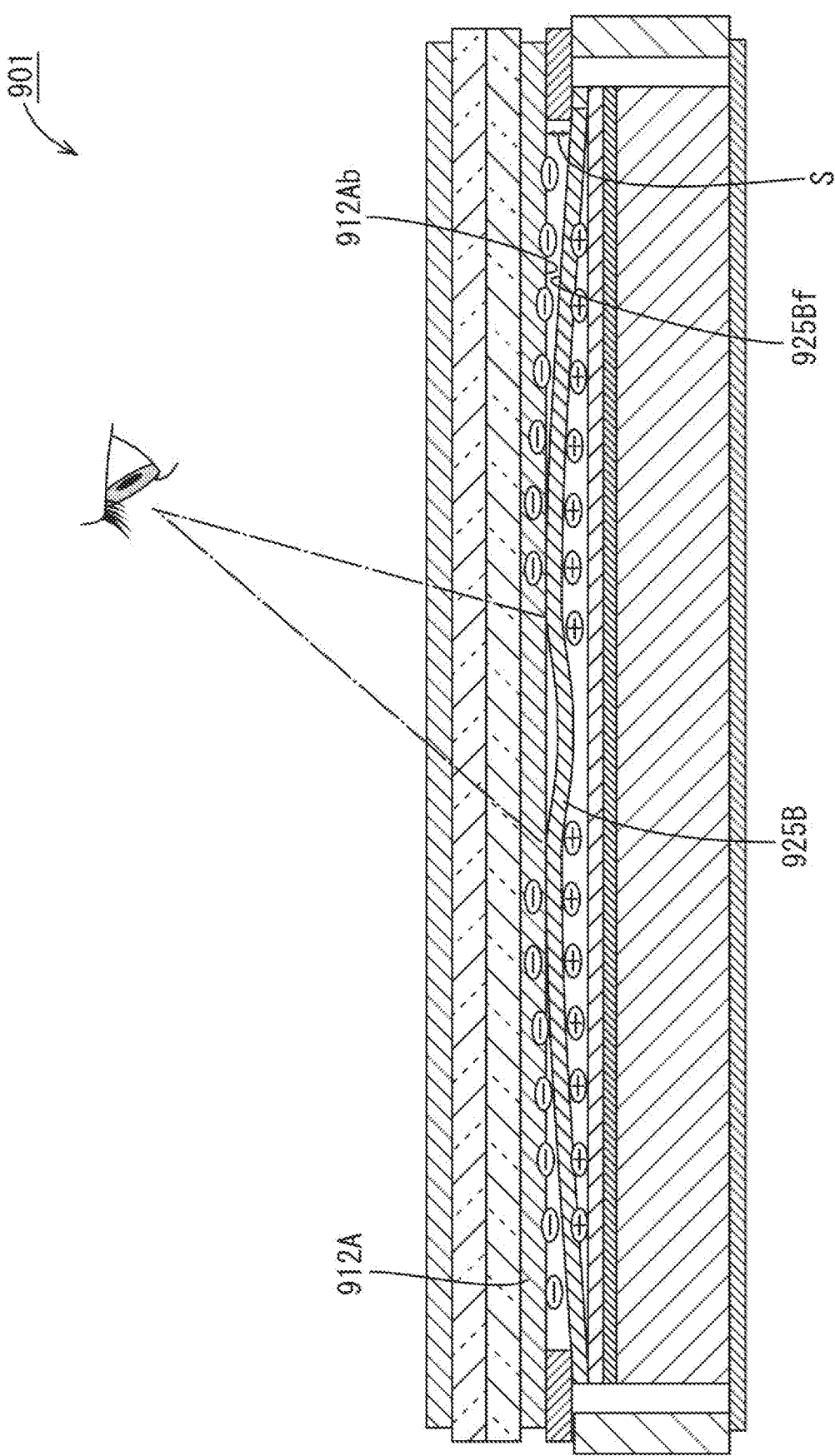

DISPLAY DEVICE AND METHOD OF PRODUCING THE SAME

CROSS REFERENCE TO RELATED APPLICATION

This application claims priority from Japanese Patent Application No. 2017-228994 filed on Nov. 29, 2017. The entire contents of the priority application are incorporated herein by reference.

TECHNICAL FIELD

The technology described herein relates to a display device and a method of producing the display apparatus.

BACKGROUND

A known display device includes optical members.

For example, a backlight device is attached to a liquid crystal display device including a liquid crystal panel as a display panel. The backlight device illuminates the liquid crystal panel that does not emit light itself. The liquid crystal panel usually includes a polarizing plate on each of a front surface (the surface on which an image is displayed) and a back surface (the surface opposite to the front surface). The polarizing plate selectively transmits light that vibrates in a specific direction. Meanwhile, a light guide plate and optical sheets such as a reflection sheet, a diffusion sheet, a lens sheet, and a prism sheet are laminated inside the backlight device attached to the back side of the liquid crystal panel. Light emitted from a light source is made incident on and guided through the light guide plate while the light is emitted toward the display panel as planar light.

In the present specification, the optical member refers to, for example, a member that imparts a predetermined optical action (e.g., polarization, reflection, selective reflection, light shielding, and wavelength conversion) to light that passes through the display device, using a property or action of the light. Examples of the optical member include the polarizing plate, the light guide plate, the reflection sheet, the diffusion sheet, the lens sheet, and the prism sheet described above. Furthermore, the optical sheet refers to an optical member that is formed to have a sufficiently small thickness relative to the area of the sheet surface and can be relatively easily deformed along the normal direction of the sheet surface. Examples of such an optical sheet include the reflection sheet, the diffusion sheet, the lens sheet, and the prism sheet described above.

Some optical members are disposed with their surfaces facing each other in a display device. In a liquid crystal display device, for example, a backside polarizing plate disposed on a back surface of a liquid crystal panel and an optical sheet disposed closest to the liquid crystal panel in a backlight device are usually disposed with a predetermined clearance therebetween. At the same time, a back surface of the backside polarizing plate and a surface of the optical sheet on the liquid crystal panel side face each other.

The clearances between the constituent members constituting a display device nave conventionally been kept at a certain length or more. However, as the thickness of display devices has been reduced in recent years, not only are the constituent members themselves thinned, but the clearances between the constituent members are also reduced. The clearances between optical members, for example, the clearance between the liquid crystal panel and the backlight device and the clearance between the optical sheets laminated in the backlight device are no exception.

If the optical members are laminated in close proximity to each other, they may adhere to each other due to static electricity generated during the production and use processes. Especially when at least one of the optical members is an optical sheet that is formed to be relatively thin and flexible, the optical sheet bends and deforms toward, and is partially adsorbed on, the other optical member. For example, when the optical sheet is deformed like a lens in this way with air or the like trapped between the optical sheet and the optical member, interference of light causes light fringes called Newton's rings, which may lead to display defects.

To address this problem, there is disclosed a technique of providing an antistatic layer including a conductive material or the like on an upper or lower portion of a protective film formed on an upper or lower portion of, for example, a polarizing film, in order to suppress the occurrence of static electricity unevenness due to static electricity. Such a technique is disclosed in Japanese Unexamined Patent Application Publication No. 2014-160246. With this technique, the static electricity generated in the polarizing plate is released to the outside through the antistatic layer, in order to suppress charging of the polarizing plate and avoid troubles that would otherwise be caused by the static electricity.

Meanwhile, during the production process, the optical members are most likely to generate static electricity in a step of peeling off a protective material or the like attached to the surface of each optical member prior to assembly. According to an exemplary configuration, the static electricity generated in the polarizing plate during the peeling step is removed from the surface of the polarizing plate by the antistatic layer, and the surface of the polarizing plate is maintained in the neutral state. Such a configuration is disclosed in Japanese Unexamined Patent Application Publication No. 2014-160246 mentioned above. Meanwhile, the static electricity generated in each optical member during use is often generated by the optical members laminated in the display device being rubbed due to shaking or the like accompanying the movement of the display device. According to an exemplary configuration in which the opposing surfaces of the polarizing plate and the optical sheet are in the neutral state, when the opposing surfaces of both members are disposed close to each other, they are easily rubbed and generate static electricity. Such a configuration is disclosed in Japanese Unexamined Patent Application Publication No. 2014-160246 mentioned above. Although the generated static electricity is to be neutralized by the antistatic layer, contact between the polarizing plate and the optical sheet and the rubbing against each other are preferably avoided in order to keep the optical functions of both members high and maintain the antistatic layer. If the antistatic layer is damaged by friction and fails to function, the neutralization may no longer be performed smoothly and a large amount of static electricity generated by friction may accumulate.

SUMMARY

The technology described herein was made in view of the above circumstances. An object is to suppress contact between optical members included in a display device, and to suppress adsorption of the members caused by rubbing between the members or static electricity.

A display device includes an optical member and an optical sheet. The optical member includes a first surface.

The optical sheet in a sheet form has a second surface disposed to be opposed to the first surface. The first surface and the second surface are charged to the same polarity.

According to the above configuration, since the first surface and the second surface that are charged to the same polarity repel each other electrostatically, both surfaces are less likely to come close to each other. Therefore, even if the optical member and the optical sheet are disposed close to each other in the display device and vibration is applied to the display device during use, the opposing surfaces of both members are less likely to come closer to each other, and scraping therebetween is suppressed. As a result, damage and charging due to friction between the surfaces of both members can be reduced and electrostatic adsorption therebetween can also be suppressed, whereby display defects caused by these problems can be suppressed.

Such an effect can be obtained not only by a configuration in which the first surface and the second surface face each other with a predetermined clearance therebetween, but also by a configuration in which the optical sheet is directly placed on the optical member, for example. The above configuration can be implemented in the following manner: a substance that is easily charged positively or negatively is disposed on each of the first surface and the second surface, and both surfaces are maintained in a state of being charged to an appropriate charge amount. For example, the first surface and the second surface are charged to the same polarity with static electricity generated in the production process, and the members disposed around the surfaces are made of an insulator, whereby both surfaces can be maintained at a desired charged state.

A method of producing a display device includes disposing the optical member and the optical sheet such that the optical member and the optical sheet face each other in a predetermined state, while adjusting charge amounts on the first surface and the second surface within a predetermined range peeling off protective materials including an insulating material and attached to the first surface and the second surface while applying a neutralization blower to the protective materials. The display device described herein can be produced by this method.

According to the above configuration, the charge amounts on the first surface and the second surface obtained by the static electricity generated on both surfaces in the production process are adjusted by the neutralization blower. As a result, it is possible to secure a sufficient charge amount for suppressing contact between the optical member and the optical sheet while suppressing a situation in which both members are excessively charged to cause a malfunction or the like of the display device. In addition, in the production process after the protective materials are peeled off, it is also possible to suppress contamination of the surfaces due to electrostatic adsorption of dust and the like.

According to the technology described herein, even in a configuration in which the clearance between optical members is reduced, rubbing between the optical members during use is suppressed, surface damage and generation of static electricity due to friction are reduced, and display defects due to electrostatic adsorption are less likely to occur. As a result, it is possible to obtain a thin display device excellent in display quality.

BRIEF DESCRIPTION OF THE DRAWINGS

FIG. 3 is a schematic diagram illustrating a schematic cross-sectional configuration in a state where Newton's rings have been generated in a conventional liquid crystal display device.

DETAILED DESCRIPTION

First Embodiment

A first embodiment will be described with reference to FIG. 1.

A liquid crystal display device (display device) 1 will be described. The upper side and the lower side in FIG. 1 correspond to the front side and the back side of the liquid crystal display device 1, respectively. Among components having the same configuration, only one of the components may be indicated by a reference sign. Plate surfaces of components on the front side may be indicated by reference sign with suffix "f." Plate surfaces of the components on the back side may be indicated by reference sign with suffix "b." The same applies to the related art and a second embodiment.

Figure 1:
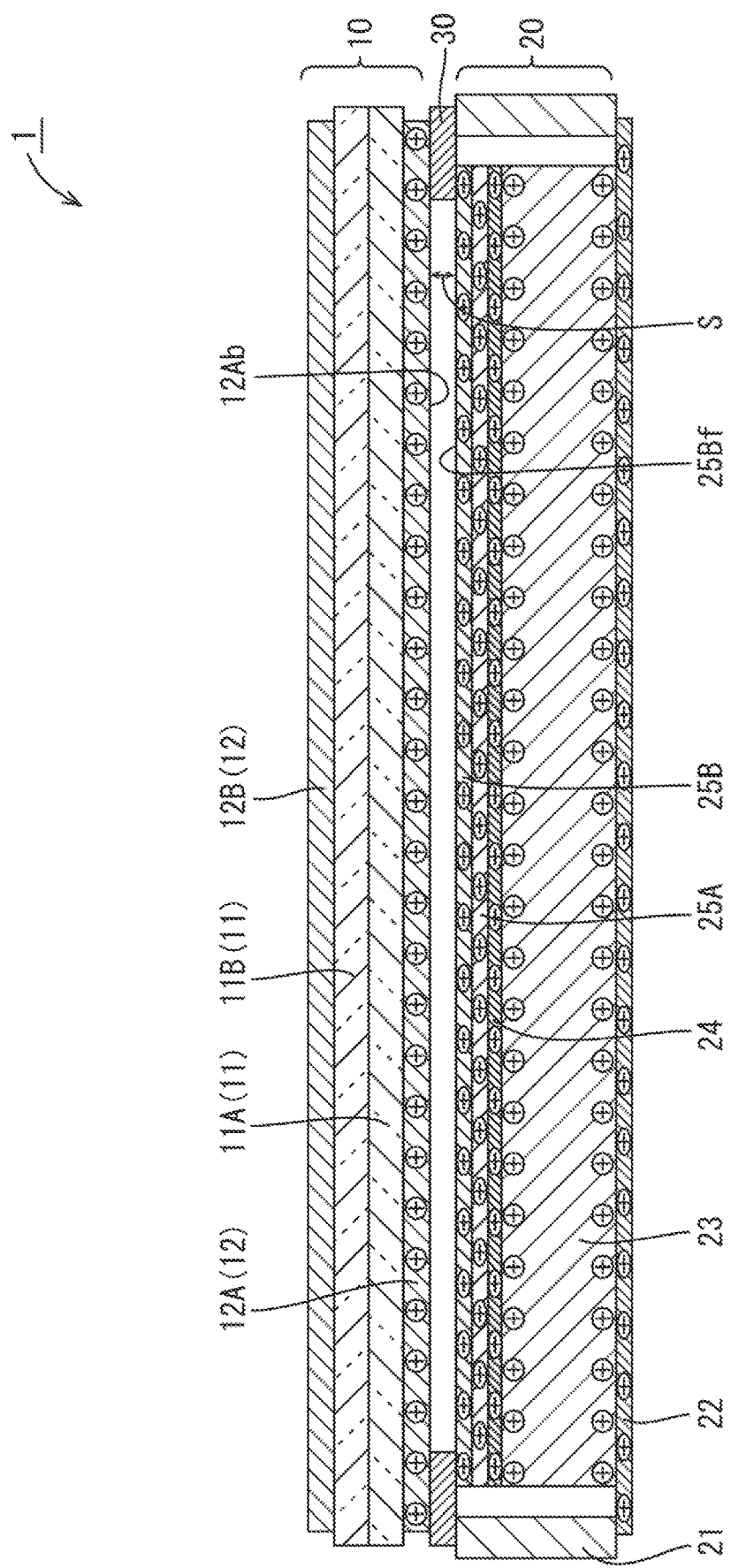
FIG. 1 is a schematic diagram illustrating a schematic cross-sectional configuration of a liquid crystal display device according to a first embodiment.

As illustrated in FIG. 1, the liquid crystal display device 1 according to the present embodiment roughly includes a liquid crystal panel 10 as a display panel and a backlight device 20 as a lighting device, which are fixed to each other with a double-sided adhesive material 30 or the like.

The liquid crystal panel 10 is not particularly limited, and a liquid crystal panel having a well-known configuration can be used.

Details of the liquid crystal panel 10 according to the first embodiment are not illustrated, but it is assumed that a pair of glass substrates 11 and 11 is bonded with a predetermined gap (not illustrated in FIG. 1) therebetween, and liquid crystal (not illustrated in FIG. 1) is enclosed between the glass substrates 11 and 11. On the glass substrate 11A disposed on the back side, for example, switching elements (for example, thin-film transistors (TFT)) connected to mutually orthogonal source wiring and gate wiring, pixel electrodes connected to the switching elements, and an alignment film are provided. On the glass substrate 11B disposed on the front side, a color filter in which colored portions of R (red), G (green), B (blue) and the like are disposed in a predetermined alignment, a counter electrode, an alignment film and the like are provided. When a predetermined potential difference is generated between the pixel electrode and the counter electrode in the liquid crystal panel 10 having such a configuration, a fringe electric field (oblique electric field) is applied to the liquid crystal layer enclosed between both glass substrates 11 and 11. This fringe electric field includes a component in a direction normal to the surfaces of the glass substrates 11 and 11. Controlling this electric field makes it possible to appropriately switch the alignment state of liquid crystal molecules in the liquid crystal layer.

In the liquid crystal panel 10 according to the first embodiment, polarizing plates 12 are disposed on the outer surfaces of the glass substrates 11 and 11. The polarizing plate 12 has function of selectively transmitting that vibrates in a specific direction. Hereinafter, the polarizing plate 12 attached to the back surface of the glass substrate 11A is referred to as a backside polarizing plate 12A, and the polarizing plate 12 attached to the front surface of the glass substrate 11B is referred to as a front-side polarizing plate 12B.

Light that has passed through the backside polarizing plate 12A and entered the liquid crystal layer propagates through the liquid crystal layer in the thickness direction thereof while changing its polarization state according to the alignment state of the liquid crystal molecules. The light that can pass through the front-side polarizing plate 12B is then emitted as display light. As described above, changing the alignment state of the liquid crystal molecules by controlling the electric field applied to the liquid crystal layer makes it possible to change the transmittance of the light passing through the liquid crystal panel 10 and display an image.

The exemplary polarizing plate 12 used in the first embodiment is one in which a polyvinyl alcohol polymer is dyed with iodine and then stretched and made into a film to make the alignment directions of iodine molecules (polarizing elements) uniform. When such a polarizing plate 12 is irradiated with light, light in the molecular axis alignment direction of iodine molecules is absorbed, and light in a direction. perpendicular to the polarizing plate 12 is transmitted.

A schematic configuration of the backlight device 20 will be described. A well-known configuration can be used for the backlight device 20 without any particular limitation.

The backlight device 20 according to the first embodiment is of a so-called edge light type (sidelight type) in which light emitting diodes (LED; not illustrated in FIG. 1) as light sources are arranged along a side edge portion of a guide plate 23 disposed inside the backlight device 20. Note that the backlight device may be of a direct type having a light source disposed on the back side of the light guide plate or may include a light source different from the LED.

As illustrated in FIG. 1, the backlight device 20 includes a frame 21 that is open on the front side, that is, on a light emission side (on the side of the liquid crystal panel 10) and on the back side, and has a predetermined thickness. The frame 21 functions as a support body that accommodates therein and supports various optical members and the like described later. An insulating material formed from a synthetic resin or the like is used for the frame 21. For example, a material obtained by subjecting a polycarbonate resin or an acrylonitrile butadiene styrene (ABS) resin to injection-molding can be used for the frame 21. The color of the frame 21 is preferably white from the viewpoint of enhancing light utilization efficiency, and preferably black from the viewpoint of suppressing light leakage to the outside, although the color is not particularly limited.

A reflection sheet 22 is disposed on the back side of the frame 21 so as to cover the opening of the frame 21 from the back side. The reflection sheet 22 is a type of optical sheet and has a function of reflecting, toward the front side, light emitted toward the back side of the light guide plate 23 described later. The amount of light emitted toward the liquid crystal panel 10 can be increased by the reflection sheet 22, whereby the brightness of a screen can be increased. Like the frame 21, an insulating material formed from a synthetic resin or the like is used for the reflection sheet 22. The front surface of the reflection sheet 22 is preferably in white that is excellent in light reflectivity.

The light guide plate 23 is disposed in front of the reflection sheet 22 in the frame 21. The light guide plate 23 has a function of allowing the light, emitted from the light sources disposed so as to face an end face of the light guide plate 23, to be incident thereon, propagating the incident internally to guide the light to the side away from the light sources while directing the light toward the light emission side (the side of the liquid crystal panel 10), and emitting the light from the front surface as planar light. The light guide plate 23 is made of, for example, a substantially transparent synthetic resin (excellent in translucency) (e.g., an acrylic resin such as PMMA, or a polycarbonate resin) having a refractive index sufficiently, higher than that of air. In the first embodiment, a polycarbonate resin is used for the light guide plate 23.

Although not illustrated in FIG. 1, as described above, an LED substrate with LEDs mounted thereon is also accommodated in a position facing the end face along the side edge portion of the light guide plate 23 in the frame 21. The LED serves as a light source of light emitted to the liquid crystal panel 10, and the LED substrate controls lighting of the LEDs according to an input signal that is input from the outside. Well-known LEDs such as a top-emission type LED and a side-emission type LED can be used without limitation. How the LED substrate is disposed can also be determined according to the type of the LED without particular limitation. The numbers of LEDs and LED substrates are not limited, either, and LEDs may be disposed so as to face end faces of the light guide plate 23.

Optical sheets are laminated on the front side (light emission side) of the light guide plate 23, and disposed between the liquid crystal panel 10 and the light guide plate 23. The optical sheets laminated on the front side of the light guide plate 23 have a function of transmitting outgoing light from the light guide plate 23, and emitting the light toward the liquid crystal panel 10 while imparting a predetermined optical action to the transmitted light. As the optical sheets, those that exhibit various optical actions can be appropriately used in combination according to required functions. The first embodiment is an example in which three optical sheets, i.e., a diffusion sheet 24, a backside lens sheet 25A, and a front-side lens sheet 25B are laminated in that order from the side of the light guide plate 23. The configuration of the optical sheets is not limited to this example, however, and various other optical sheets such as a prism sheet and a polarizing reflection sheet may be provided instead of, or in addition to, the diffusion sheet 24 and the lens sheets 25A and 25B.

In the first embodiment, the diffusion sheet 24 is laminated directly on the front surface of the light guide plate 23. The diffusion sheet 24 allows the light, which has been emitted from the light guide plate 23 and entered through the back side of the diffusion sheet 24, to be diffused and emitted toward the front side (light emission side, i.e., the side of the liquid crystal panel 10). The diffusion sheet 24 has a function of equalizing the amount of light from the light sources. The diffusion sheet 24 can be made of, for example, a material prepared in the following manner: light diffusing particles (filler) including silica, aluminum hydroxide, zinc oxide, an acrylic resin, polyurethane, polystyrene or the like are blended and dispersed in a substantially transparent sheet-like base material having an excellent translucency and including an acrylic resin, polyurethane, polyester, a silicone resin, an epoxy resin or the like. The exemplary diffusion sheet 24 in the first embodiment is one in which small prisms each having a refracting surface are formed continuously on one surface of a sheet including a sheet-like polycarbonate resin. In the diffusion sheet 24 according to the first embodiment, light is diffused by the surface refraction of the prisms formed on the front surface of the diffusion sheet 24.

In the first embodiment, the backside lens sheet 25A and the front-side lens sheet 25B are laminated in that order on the front surface of the diffusion sheet 24. The lens sheets 25A and 25B adjust the traveling direction of the light that has passed through the diffusion sheet 24 and have a light condensing function. The exemplary lens sheets 25A and 25B in the first embodiment have a configuration in which a large number of unit lenses extending in one direction are arranged along a direction orthogonal to the extending direction thereof, and lens grooves are formed of an acrylic resin in a polyester resin sheet.

One adhesive surface of the double-sided adhesive material 30 is attached to the peripheral portion of a front surface 25B$f$ of the front-side lens sheet 25B and to the front surface of the frame 21, in the backlight device 20 including the above-described members. Meanwhile, the other adhesive surface is attached to the peripheral portion of a back surface 12A$b$ of the backside polarizing plate 12A of the liquid crystal panel 10. As a result, the liquid crystal panel 10 and the backlight device 20 are fixed to each other. With this configuration, as illustrated in FIG. 1, the back surface 12A$b$ of the backside polarizing plate 12A and the front surface 25B$f$ of the front-side lens sheet 25B are disposed facing each other while forming a clearance S therebetween that is equal to the thickness of the double-sided adhesive material 30.

In the liquid crystal display device 1 according to the first embodiment, the backside polarizing plate 12A, the reflection sheet 22, the light guide plate 23, the diffusion sheet 24, the backside lens sheet 25A, and the front-side lens sheet 25B, which are optical members, are charged such that at least the opposing surfaces of these members have a positive polarity. Specifically, the back surface of the backside polarizing plate 12A, the front surface of the reflection sheet 22, and both surfaces of each of the light guide plate 23, the diffusion sheet 24, the backside lens sheet 25A, and the front-side lens sheet 25B are charged to have a positive polarity.

The first embodiment is an example of implementing the liquid crystal display device 1 having the above-described configuration, in which a positive chargeable material that easily has a positive polarity is kneaded into each optical member.

The positive chargeable material preferably includes a substance that is listed on the positive side of mica in the triboelectric series. When such a substance is rubbed with another substance, there is a high possibility that the chargeable material is positively charged (while the other substance is negatively charged). Among other things, a substance including, for example, a glass component can be preferably used. A filler including a glass component is widely used for various applications, and it is easy to obtain such fillers having various properties and dimensional shapes such as a micro spherical shape, a fibrous shape, and a frame shape. Therefore, such a filler is preferable from the viewpoint of imparting a desired charging performance to an optical member without impairing the optical function of the optical member.

Note that as long as another substance having a possibility of scraping the target optical member is specified, the substance is not limited to those described above. A chargeable material including a substance listed on the positive side if the other substance in the triboelectric series can be used as a positive chargeable material. The positive chargeable materials to be kneaded into opposing optical members need not include the same substance, but may include different substances. The first embodiment is an example in which a glass component is used as a positive chargeable material.

The method of kneading a chargeable material into each optical member is not particularly limited. For example, a chargeable material may be added to a synthetic resin or the like serving as a base material of each optical member, and melt, kneaded, and dispersed, and then the mixture may be molded. A chargeable material is present on a surface of each optical member in order to exert a charging effect. In the case of an optical member having a large thickness, therefore, it is preferable that a chargeable material be dispersed over an entire base resin and the density of the chargeable material be made higher on the surface layer side using the specific gravity and other properties at the time of or after molding. Alternatively, after each optical member is molded, only a surface layer portion thereof may be melted and softened in order to knead a chargeable material into the optical member. As illustrated in FIG. 1, in the first embodiment, the light guide plate 23 includes a chargeable material mainly near the front and back surfaces thereof.

In a case where a chargeable material is kneaded into each optical member as in the first embodiment, the reliability and durability of the charging performance exerted by the chargeable material can be enhanced as compared to a configuration in which a chargeable material is applied only to a surface layer, for example. At the time of kneading a chargeable material into an optical member, it is preferable to adjust the dimensional shape, density, component, distribution state and the like of the chargeable material in order to maintain the optical function of each optical member and obtain an appropriate charge amount with the chargeable material at least partially exposed on the surface of the target optical member.

Next, an exemplary method of producing the liquid crystal display device 1 according to the present embodiment will be described.

The liquid crystal display device 1 is roughly configured in the following manner: prepared constituent members are disposed in a predetermined state to assemble the liquid crystal panel 10 and the backlight device 20 separately, and the double-sided adhesive material 30 is attached to the front surface of the frame 21, the peripheral portion of the front surface of the front-side lens sheet 25B, and the peripheral portion of the back surface of the backside polarizing plate 12A, whereby the liquid crystal panel 10 and the backlight device 20 are fixed to each other.

Next, attention will be focused on two optical members, i.e., the backside polarizing plate 12A and the front-side lens sheet 25B, and the step of disposing these members with their surfaces facing each other and the operation according to the first embodiment will be described. Although the description about the other optical members is omitted, a similar effect can be obtained through a similar step of disposing the optical members in predetermined positions with their surfaces facing each other.

The step of disposing both members will be described. As described above, when the liquid crystal panel 10 and the backlight device 20 are assembled together, the backside polarizing plate 12A and the front-side lens sheet 25B are disposed at predetermined positions with the back surface 12A$b$ (corresponding to the first surface in the claims) and the front surface 25B$f$ (corresponding to the second surface in the claims) facing each other.

First, the backside polarizing plate 12A and the front-side lens sheet 25B are prepared in which glass components are kneaded as positive chargeable materials. The backside polarizing plate 12A is prepared such that the back surface 12A$b$ includes the glass component. The front-side lens sheet 25B is prepared such that the front surface 25B$f$ includes the glass component. The backside polarizing plate 12A and the front-side lens sheet 25B are each usually stored or transported with protective materials attached to both surfaces thereof in order to protect the surfaces. Here, the protective material to be used usually includes a polyethylene resin, a polypropylene resin or the like. In the first embodiment, for example, a polyethylene film is used as a protective material for both the back surface 12A*b* of the backside polarizing plate 12A and the front surface 25B*f* of the front-side lens sheet 25B. The protective materials for the back surface 12A*b* and the front surface 25B*f* do not necessarily have to be the same as long as the protective materials include a substance listed, in the triboelectric series, on the negative side of the positive chargeable material included in each surface.

In producing the liquid crystal display device 1, the protective materials attached to the backside polarizing plate 12A and the front-side lens sheet 25B as described above are peeled off.

For example, only the protective material attached to the front surface of the backside polarizing plate 12A is peeled off and the backside polarizing plate 12A is attached to the back surface of the backside glass substrate 11A, whereby the liquid crystal panel 10 with the protective material attached to the back surface 12A*b* is assembled. Meanwhile, the protective material attached to the back surface of the front-side lens sheet 25B is peeled off and the front-side lens sheet 25B is placed on the laminate of the light guide plate 23, the diffusion sheet 24, and the backside lens sheet 25A sequentially laminated in the frame 21 on the front side of the reflection sheet 22. In this manner, the backlight device 20 with the protective material attached to the front surface 25B*f* is assembled.

Next, the protective materials attached to the back surface 12A*b* of the liquid crystal panel 10 and the front surface 25B*f* of the backlight device 20 are peeled off, and the double-sided adhesive material 30 is attached to the peripheral portions of the back surface 12A*b* and the front surface 25B*f*. In this manner, the liquid crystal panel 10 and the backlight device 20 are assembled together. As a result, the backside polarizing plate 12A and the front-side lens sheet 25B are disposed relative to each other while forming a predetermined clearance that is equal to the thickness of the double-sided adhesive material 30, with the back surface 12A*b* and the front surface 25B*f* facing each other.

Here, the protective materials are attached to the back surface 12A*b* and the front surface 25B*f* while being in close contact with these surfaces so as to protect the surfaces. Therefore, static electricity is generated when the protective materials are peeled off. The polyethylene resin constituting the protective materials according to the first embodiment is listed, in the triboelectric series, on the negative side of the glass used as the positive chargeable material in the first embodiment. When the protective materials are peeled off, therefore, the protective materials are negatively charged while the back surface 12A*b* and the front surface 25B*f* are positively charged. In addition, since the polyethylene resin exemplified in the first embodiment is located away from the glass, the charge amount of the polyethylene resin is also relatively large.

At the time of peeling off the protective materials, therefore, it is preferable to apply a neutralization blower to the back surface 12A*b* or the front surface 25B*f*, and to adjust the charge amount to an appropriate amount while monitoring the charge amount on these surfaces. With a preferable charge amount, a repulsive force corresponding to a predetermined clearance can be maintained between both surfaces. The larger the charge amount is, the more it is possible to suppress the friction and adsorption between both surfaces disposed facing each other. If the charge amount becomes too large, however, both surfaces may be deformed in the directions away from each other or the driving of the liquid crystal display device 1 may be adversely affected, so care should be taken not to make the charge amount excessive.

The action of charging on the backside polarizing plate 12A of the liquid crystal panel 10 and the front-side lens sheet 25B of the backlight device 20 that are disposed facing each other as described above will be described with reference to FIGS. 1 and 3, in comparison with a liquid crystal display device 901 having a conventional configuration.

The liquid crystal display device 901 illustrated in FIG. 3 includes a backside polarizing plate 912A and a front-side lens sheet 925B, neither of which is charged. The liquid crystal display device 901 includes optical members having similar functions to those of the liquid crystal display device 1, but the description thereof will be omitted.

The liquid crystal display device 901 is produced using a neutralization blower or the like such that a back surface 912A*b* of the backside polarizing plate 912A and a front surface 925B*f* of the front-side lens sheet 925B are in a neutral state, that is, not charged. When such a liquid crystal display device 901 vibrates while being used, for example, the back surface 912A*b* and the front surface 925B*f* designed to have a relatively small clearance S for the purpose of thinning the device and disposed close to each other are easily rubbed. Due to static electricity generated by friction at this time, the backside polarizing plate 912A is negatively charged while the front-side lens sheet 925B is positively charged, for example. In this case, the relatively flexible front-side lens sheet 925B deforms as illustrated in FIG. 3 by an electrostatic attractive force and deforms into the shape of a concave lens while trapping air or the like between the front-side lens sheet 925B and the backside polarizing plate 912A. When the front-side lens sheet 925B deforms in this manner, concentric light fringes, so-called Newton's rings, are generated due to interference of light passing through the front-side lens sheet 925B when the liquid crystal display device 901 is viewed from the front side (image display surface side). These Newton's rings are recognized as display defects. Furthermore, since the back surface 912A*b* and the front surface 925B*f* are easily rubbed, these opposing surfaces may be damaged.

In contrast, in the liquid crystal display device 1 accordion to the first embodiment, as illustrated in FIG. 1, the back surface 12A*b* of the backside polarizing plate 12A and the front surface 25B*f* of the front-side lens sheet 25B that are disposed facing each other are both positively charged and a repulsive force acts between both surfaces. Therefore, the relatively flexible front-side lens sheet 25B is kept pressed against the backside lens sheet 25A. In such a liquid crystal display device 1, even if the clearance S is designed to be relatively small and the device vibrates during use, for example, the backside polarizing plate 12A and the front-side lens sheet 25B are less likely to be rubbed. Therefore, damage on the back surface 12A*b* and the front surface 25B*f*, which are opposing surfaces of the backside polarizing plate 12A and the front-side lens sheet 25B, and generation of static electricity on these surfaces are reduced, and the possibility that both surfaces are adsorbed by an electrostatic attractive force is also reduced.

The configuration and effects of the first embodiment will be described below.

The liquid crystal display device (display device) 1 according to the first embodiment has the configurations described in the following [1] to [4].

[1] A display device includes an optical member having a first surface, and an optical sheet formed into a sheet shape and having a second surface disposed facing the first surface. The first surface and the second surface are charged to a same polarity.

The liquid crystal display device 1 according to the first embodiment includes, for example, the backside polarizing plate 12A (optical member) having the back surface 12A*b* (first surface), and the front-side lens sheet 25B (optical sheet) formed into a sheet shape and having the front surface 25B*f* (second surface) that is disposed facing the back surface 12A*b*. The back surface 12A*b* and the front surface 25B*f* are both positively charged (have the same polarity). As a result, the back surface 12A*b* and the front surface 25B*f* are electrostatically repelled and less likely to come close to each other. Therefore, even if the backside polarizing plate 12A and the front-side lens sheet 25B are disposed close to each other in the liquid crystal display device 1 and vibration is applied to the liquid crystal display device 1 during use, the opposing surfaces of both members are less likely to come closer to each other, and scraping therebetween is suppressed. As a result, damage and charging due to friction between the surfaces of both members can be reduced and electrostatic adsorption therebetween can also be suppressed, whereby display defects caused by these problems can be suppressed.

The above effect can be obtained not only by the configuration related to the backside polarizing plate 12A and the front-side lens sheet 25B in which the back surface, 12A*b* and the front surface 25B*f* are disposed facing each other while forming the predetermined clearance S, but also by the configuration in which a clearance is not formed between opposing surfaces, for example, a configuration related to the light guide plate (optical member) 23 and the diffusion sheet (optical sheet) 24 placed directly on the light guide plate 23.

[2], In the configuration of the above [1], both the first surface and the second surface include a positive chargeable material including a substance is listed on a positive side of mica in a triboelectric series.

With this configuration, many substances are on the negative side of the chargeable material, and therefore both surfaces including the chargeable material can easily be charged positively.

In the liquid crystal display device 1 according to the first embodiment, for example, both the back surface 12A*b* (first surface) and the front surface 25B*f* (second surface) include a glass component (positive chargeable material) that is listed on the positive side of mica in the triboelectric series. As a result, both the back surface 12A*b* and the front surface 25B*f* are configured to easily have a positive polarity. With both surfaces positively charged, it is possible to implement the configuration of the above [1] and obtain the effect thereof. In the first embodiment, a glass component is used as the positive chargeable material in both surfaces. However, the positive chargeable material included in the first surface and the positive chargeable material included in the second surface may be different.

Here, in the first embodiment, the chargeable material is kneaded into each optical member, whereby the first surface and the second surface include the chargeable material. As a result, the reliability and durability of the charging performance exerted by the chargeable material can be enhanced as compared to a configuration in which a chargeable material is applied only to a surface layer of each optical member, for example.

[3] In the configuration of the above [1] or [2], the display device further includes a display panel configured to display an image on a front surface thereof, and a lighting device disposed on a back side of the display panel and configured to irradiate the display panel with light. The optical member is a backside polarizing plate that is disposed on a backmost side of the display panel and configured to transmit light that vibrates in a specific direction among light emitted from the lighting device. The optical sheet is disposed on a side closest to the display panel in the lighting device and configured to impart a predetermined optical action to light emitted toward the display panel.

The liquid crystal display device 1 according to the first embodiment includes the liquid crystal panel (display panel) 10 and the backlight device (lighting device) 20. The backside polarizing plate (optical sheet) 12A is disposed on the backmost side of the liquid crystal panel 10 and transmits light that vibrates in specific direction among the light emitted from the backlight device 20. The front-side lens sheet (optical sheet) 25B is disposed closest to the liquid crystal panel 10 in the backlight device 20 and imparts a predetermined optical action to the light emitted toward the liquid crystal panel 10. This is the configuration of the above [1] or [2] as described above.

This configuration suppresses the occurrence of Newton's rings caused by the adsorption between the backside polarizing plate 12A and the front-side lens sheet 25B, which is the most prominent problem.

[4] In the configurations of the above [1] to [3], the display device further includes a lighting device configured to irradiate, with light, display panel that displays an image. The optical member is one optical member disposed in the lighting device. The optical sheet is laminated on the one optical member in the lighting device.

The liquid crystal display device 1 according to the first embodiment includes the backlight device 20. The reflection sheet 22, the light guide plate 23, the diffusion sheet 24, the backside lens sheet 25A, and the front-side lens sheet 25B are laminated in the backlight device 20 as optical members. This is the configuration of the above [1] or [2]. The liquid crystal display device 1 also has the configuration of the above [3].

As described above, the present technology is applicable to the purpose of suppressing, for example, adsorption between various optical sheets laminated in the backlight device 20 (for example, between the diffusion sheet 24 and the backside lens sheet 25A, and between the backside lens sheet 25A and the front-side lens sheet 25B) and adsorption between the light guide plate 23 and the optical sheet (for example, between the light guide plate 23 and the reflection sheet 22, and between the light guide plate 23 and the diffusion sheet 24).

The liquid crystal display device 1 according to the first embodiment can be produced by the production method described in [5] below.

[5] A method of producing the display device according to any one of the above [1] to [4] includes disposing the optical member and the optical sheet such that the optical member and the optical sheet face each other in a predetermined state, while adjusting charge amounts on the first surface and the second surface within a predetermined range by peeling off protective materials including an insulating material and attached to the first surface and the second surface while applying a neutralization blower to the protective materials.

According to the first embodiment, static electricity generated in the peeling step included in the process of producing the liquid crystal display device 1, for example, static electricity generated in the step of peeling off the protective materials attached to the back surface 12A*b* (first surface) and the front surface 25B*f* (second surface) is used to positively charge both surfaces (impart the same polarity), and the charge amount is adjusted by the neutralization blower. This makes it possible to secure a sufficient charge amount for suppressing contact between the backside polarizing plate 12A and the front-side lens sheet 25B, and at the same time suppress a situation in which both members are excessively charged to cause a malfunction or the like of the liquid crystal display device 1.

Here, in the first embodiment, the liquid crystal panel 10 including the backside polarizing plate 12A and the backlight device 20 including the front-side lens sheet 25B are separately assembled, after which the protective materials attached to the back surface 12A*b* and the front surface 25B*f* are peeled off to adjust the charge amounts on the surfaces, and then the double-sided adhesive material 30 is attached to both surfaces to assemble the liquid crystal panel 10 and the backlight device 20 together. Adjusting the charged state on both surfaces in a relatively late stage of the production process as described above is preferable because this makes it easy to adjust the charge amount in the liquid crystal display device 1 after completion the assembly. Since the members such as the frame 21 disposed around both surfaces have insulating properties, it is easy to maintain both surfaces in a desired charged state in the produced liquid crystal display device 1.

Furthermore, as in the above [5], adjusting the charge amounts with the neutralization blower at the time of peeling off the protective materials makes it possible to suppress a situation in which dust or the like adheres to the surfaces by electrostatic adsorption and contaminates the surfaces in the subsequent production process, for example.

Second Embodiment

A second embodiment will be described with reference to FIG. 2. A liquid crystal play device 201 according to the second embodiment is different from the liquid crystal display device 1 according to the first embodiment in that a chargeable layer including a negative chargeable material is formed on a surface of an optical member. In the following description, attention will be paid to a backside polarizing plate 212A and a front-side lens sheet 225B among optical members included in the liquid crystal display device 201 and these members will be described, while the description of the other members is omitted. The schematic configuration of the liquid crystal display device 201 is similar to that of the liquid crystal display device 1 according to the first embodiment, except that each optical member does not include a positive chargeable material.

Figure 2:
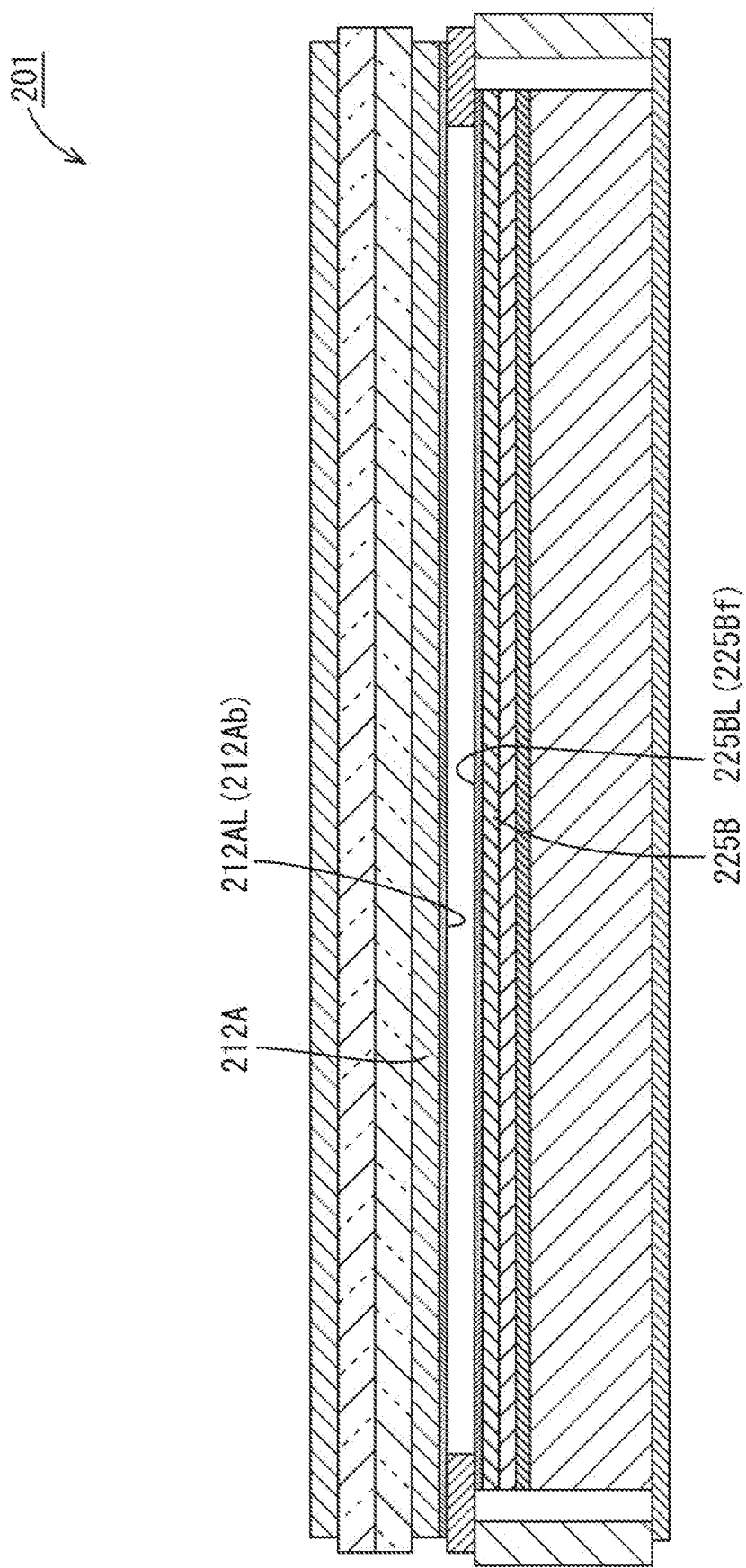
FIG. 2 is a schematic diagram illustrating a schematic cross-sectional configuration of a liquid crystal display device according to a second embodiment.

A glass component (positive chargeable material) is not kneaded the backside polarizing plate 212A or the front-side lens sheet 225B according to the second embodiment and, as illustrated in FIG. 2, chargeable layers 212AL and 225BL each including a negative chargeable material are formed on a back surface 212A*b* and a front surface 225B*f*, respectively.

A negative chargeable material preferably includes a substance that is listed on the negative side of polyester in the triboelectric series. When such a substance is rubbed with another substance, there is a high possibility that the chargeable material is negatively charged while the other substance is positively charged). Among other things, a substance including, for example, an acrylic component or a polyethylene component can be preferably used. Such substances having various properties can be easily obtained, and are therefore preferable from the viewpoint of imparting a desired charging performance without impairing the optical function of an optical member.

Note that as long as another substance having a possibility of scraping the target optical member is specified, the substance is not limited to those described above. A chargeable material including a substance listed on the negative side of the other substance in the triboelectric series can be used as a negative chargeable material. The negative chargeable materials included in the chargeable layers disposed on opposing optical members may include different substances. The second embodiment is an example in which an acrylic component is used as the negative chargeable material.

The method of forming the chargeable layers on the target surfaces of the optical members is not particularly limited. For example, a chargeable material may be applied to the corresponding surface as it is. Alternatively, a chargeable material may be dispersed in a binder resin and the mixture may be applied/printed on the target surfaces of the optical members after being molded, or may be adhered to the surfaces by spraying. In the case where the chargeable layer is formed in this way, it is possible to exhibit a desired charging performance while reducing the usage of the chargeable material as compared to a configuration in which a chargeable material is kneaded into an entire optical member, for example. At the time of forming the chargeable layer, it is preferable to adjust the dimensional shape, density, component, distribution state and the like of the chargeable material in order to maintain the optical function of each optical member and obtain an appropriate charge amount.

The chargeable layers 212AL and 225BL each including an acrylic component as a chargeable material are formed on the backside polarizing plate 212A and the front-side lens sheet 225B, respectively. The backside polarizing plate 212A and the front-side lens sheet 225B are stored or transported with protective materials attached to their opposing surfaces in order to protect the surfaces. Here, in the second embodiment, the protective material used includes a substance that is listed on the positive side of polyester in the triboelectric series. In the second embodiment, for example, a nylon film is used as the protective material for both the chargeable layer 212AL on the backside polarizing plate 212A and the chargeable layer 225BL on the front-side lens sheet 225B.

When the protective materials adhering to these surfaces for protecting the backside polarizing plate 212A and the front-side lens sheet 225B are peeled off, static electricity is generated by friction. The nylon resin constituting the protective material according to the second embodiment is listed, in the triboelectric series, on the positive side of the acrylic resin used as the negative chargeable material in the second embodiment. When the protective materials are peeled off, therefore, the protective materials are positively charged while the chargeable layers 212AL and 225BL are negatively charged. At the time of peeling off the protective materials, it is preferable to apply a neutralization blower to the protective materials and adjust the charge amount thereon to an appropriate amount.

In this manner, with the chargeable layers 212AL and 225BL negatively charged (having the same polarity), the backside polarizing plate 212A and the front-side lens sheet 225B are disposed at predetermined positions with both layers facing each other, whereby the liquid crystal display device 201 is obtained.

As described above, unlike the first embodiment, the second embodiment has the configuration described in [6] below.

[6] In the configuration of the above [1] described in the first embodiment, both the first surface and the second surface include a negative chargeable material including a substance that is listed on a negative side of polyester in a triboelectric series.

With this configuration, many substances are on the positive side of the chargeable material, and therefore both surfaces including the chargeable material can easily be negatively charged.

In the liquid crystal display device 201 according to the second embodiment, both the back surface 212A$b$ and the front surface 225B$f$ include an acrylic component (chargeable material) that is listed on the negative side of polyester in the triboelectric series. As a result, both surfaces disposed facing each other are configured to easily have a negative polarity. With both surfaces negatively charged, it is possible to implement the configuration of the above [1] and obtain the effect thereof.

Here, in the second embodiment, the chargeable layers 212AL and 225BL each including a negative chargeable material are formed on the back surface 212A$b$ and the front surface 225B$f$, respectively. In this case, it is possible to exhibit a desired charging performance while reducing the usage of the chargeable material as compared to a configuration in which a chargeable material is kneaded into an entire optical member, for example.

OTHER EMBODIMENTS

The technology described herein is not limited to the embodiments described above and with reference to the drawings. The following embodiments may be included in the technical scope.

(1) For example, it is possible to scrape the first surface and the second surface with a substance that is likely to generate static electricity (the substance herein being listed, in the triboelectric series, near the polarity that is opposite to the polarity to which the used chargeable material belongs, and located away from the chargeable material), and to apply a neutralization blower to both surfaces while monitoring the charge amount in order to obtain a desired polarity and a desired charge amount.

(2) The base material itself constituting the optical member or the optical sheet may be a chargeable material that is easily charged positively or negatively.

(3) Among the optical members laminated in the backlight device 20, only a part of the members having surfaces facing each other may be charged to have a predetermined polarity.

(4) For example, the backlight device 20 may have a structure including, instead of or in addition to the frame 21, a box-shaped chassis (housing) having a bottom surface (back surface) on which the reflection sheet 22 is placed. If the box-shaped chassis is configured to cover the outer side of the backlight device 20 except for the front surface opening toward the liquid crystal panel 10, electric leakage or discharge from each optical member and unintentional supply of electrons to each optical member can be suppressed, for example, making it easy to maintain the charged state of each optical member.

The invention claimed is:

1. A display device comprising:
    an optical member including a first surface;
    an optical sheet in a flexible sheet form and including a second surface disposed to be opposed to the first surface;
    a display panel configured to display an image on a front surface thereof; and
    a lighting device disposed on a back side of the display panel and configured to irradiate the display panel with light, wherein
    the first surface and the second surface are charged to a same polarity,
    the first surface and the second surface are in close proximity and form a clearance,
    the optical member is a backside polarizing plate that is disposed on a backmost side of the display panel and configured to transmit light that vibrates in a specific direction among light emitted from the lighting device, and
    the optical sheet is disposed on a side closest to the display panel, in the lighting device, and configured to impart a predetermined optical action to light emitted toward the display panel.

2. The display device according to claim 1, wherein the first surface and the second surface include a positive chargeable material including a substance that is listed on a positive side of mica in a triboelectric series.

3. The display device according to claim 1, wherein the first surface and the second surface include a negative chargeable material including a substance that is listed on a negative side of polyester in a triboelectric series.

4. The display device according to claim 1, further comprising a double-sided adhesive material attached to a peripheral portion of the first surface and a peripheral portion of the second surface.

5. A method of producing the display device according to claim 1, the method comprising:
    disposing the optical member and the optical sheet such that the optical member and the optical sheet face each other in a predetermined state, while adjusting charge amounts on the first surface and the second surface within a predetermined range, bar peeling off protective materials including an insulating material and attached to the first surface and the second surface, while applying a neutralization blower to the protective materials.

* * * * *